UNITED STATES PATENT OFFICE.

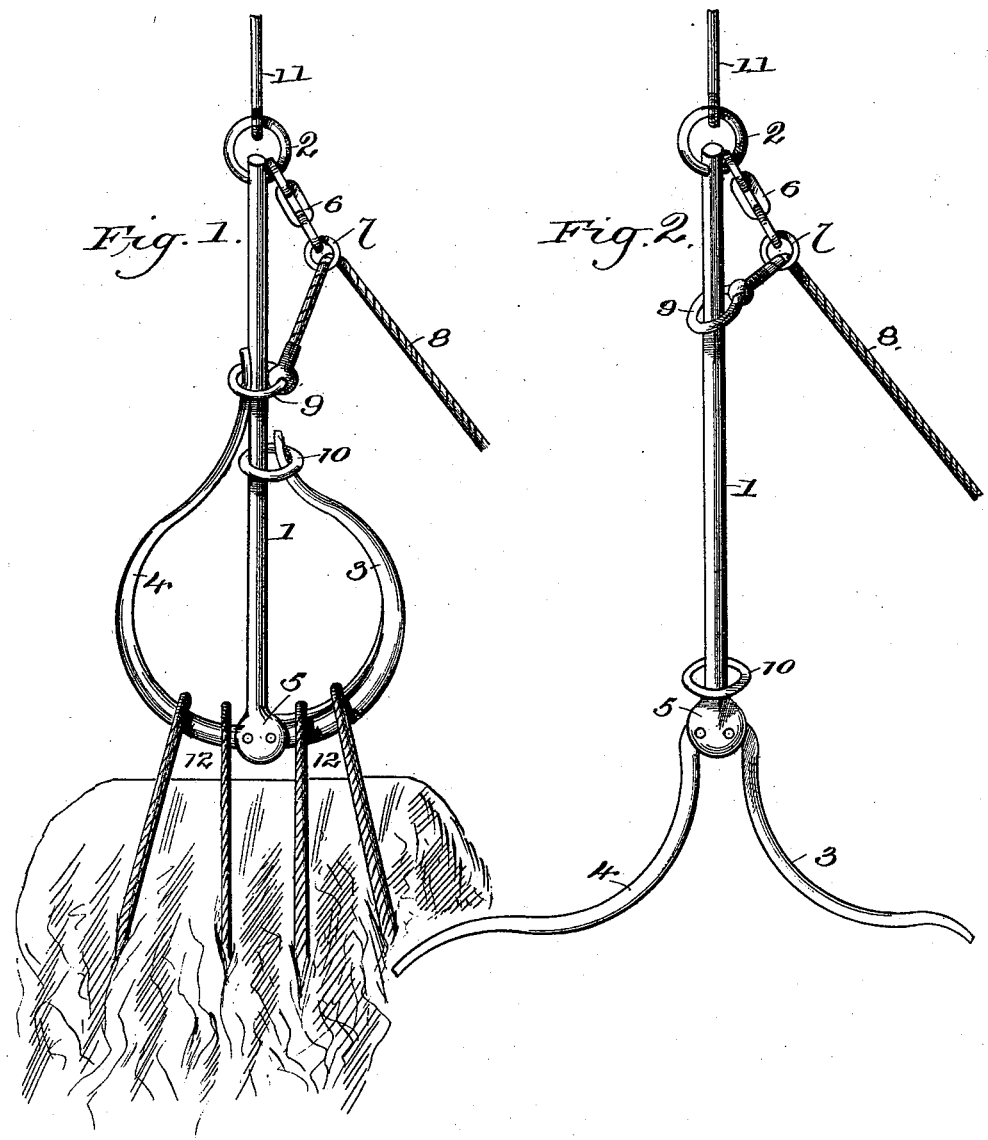

ORSON BRIGGS, OF ST. LOUIS, MICHIGAN.

HAY-LIFTER.

SPECIFICATION forming part of Letters Patent No. 517,945, dated April 10, 1894.

Application filed December 13, 1893. Serial No. 493,577. (No model.)

*To all whom it may concern:*

Be it known that I, ORSON BRIGGS, a citizen of the United States, residing at St. Louis, in the county of Gratiot and State of Michigan, have invented certain new and useful Improvements in Hay-Lifters; and I do hereby declare the following to be a full, clear, and exact description of the invention, such as will enable others skilled in the art to which it appertains to make and use the same.

This invention relates to hay lifters, and has for its object to provide simple and positively acting means for raising large quantities of hay in the operation of stacking or storing away in a mow.

With these and other objects in view, the invention consists of the construction and arrangement of the several parts, which will be more fully hereinafter described and claimed.

In the drawings: Figure 1 is a perspective view of a hay elevator, embodying the invention, and shown in closed position, and as having a quantity of hay carried thereby. Fig. 2 is a similar view of the improved device, shown open and as releasing the hay.

Similar numerals of reference are employed to indicate corresponding parts in both the views.

Referring to the drawings, the numeral 1 designates a central support having a ring 2 attached to the upper end thereof, and curved arms 3 and 4 hinged to the lower enlarged portion 5 of said support. The arm 4 is longer than the arm 3 and extends upward a greater distance over the length of the support than the arm 3. Secured to the ring 2 by a chain 6 is a guide ring 7 and through the said guide ring extends a trip cord or rope 8 which is secured to an upper ring 9 mounted on the support 1 and adapted to be thrown over the upper end of the arm 4 when the device is in closed position; as shown in Fig. 1. Below the ring 9 is a second securing ring 10, both of said rings 9 and 10 being loosely mounted on the support, and the said ring 10 being adapted to engage the upper end of the arm 3. The elevating rope, cord or cable 11 is secured to the ring 2 at the upper end of the support 1, while the drop cord or rope 8 extends any suitable distance away from the device to be readily engaged and operated when desired. The entire device is lowered to receive a jag or quantity of hay which is secured to the arms 3 and 4 by binding ropes 12, and the said arms 3 and 4 are then raised to the position shown in Fig. 1, and their upper ends engaged by the rings 9 and 10. The entire elevator is then lifted by means of the rope, cable or analogous device 11 to the desired height, and by suddenly jerking the rope 8, the ring 9 is disengaged from the upper end of the arm 4 to thereby release the said arm and permit the weight of the hay thereon to draw the same downward, and at the same time throw the support slightly to one side to allow the ring 10 to disengage itself from the other arm 3 and thereby also to permit the latter arm to drop as shown in Fig. 2 and release the hay from the elevator. The binding ropes are then removed from the hay, which operation is permitted by the slack of said ropes through the release of the arms 3 and 4, the ring 10 becomes disengaged by the jerking action on the trip cord or rope 8 slightly throwing the support 1 sidewise or it may be released by an operator standing in the proper position to engage the same when a dump or dropping of the load carried by the lifter is desired.

The device as an entirety can be employed to elevate great quantities of hay in a simple manner and the quantity elevated thereby will be in proportion to the lifting power exerted on the support through the rope, cord, chain, or other device 11; and the entire construction is simple and light in its nature and therefore comparatively inexpensive.

Having thus described the invention, what is claimed as new is—

1. In a hay lifter, the combination of a support having a lifting device attached to the upper end thereof, arms hinged to the lower end of said support, rings mounted on said support, and adapted to engage the upper ends of said arms, and a trip rope, or cord attached to the uppermost of said rings, substantially as described.

2. In a hay lifter, the combination of a support having a ring at the upper end thereof, a lifting device attached to said ring, a guide ring loosely depending from said ring at the upper end of the support, a pair of curved arms hinged to the lower portion of said support, one of which is longer than the other, and a pair of rings loosely surrounding the support and adapted to engage the upper ends of the said arms, and a trip rope, or cord passing through the said guide ring, and attached to the uppermost of said rings on the support, substantially as and for the purpose specified.

In testimony whereof I have signed this specification in the presence of two subscribing witnesses.

ORSON BRIGGS.

Witnesses:
SIMON DEURSTIN,
C. W. YERINGTON.